No Printed Specification Available
1741X
R. U. Richards,
Making Shoe Pegs.
Patented May 23, 1812.
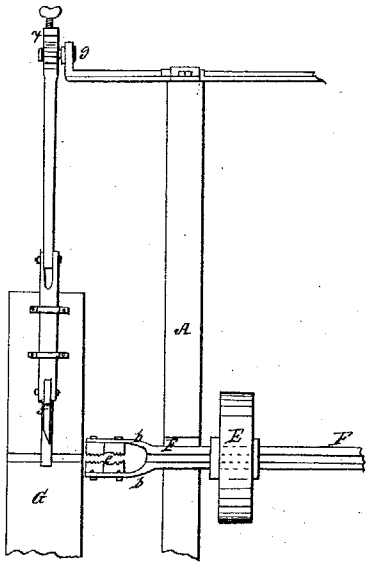
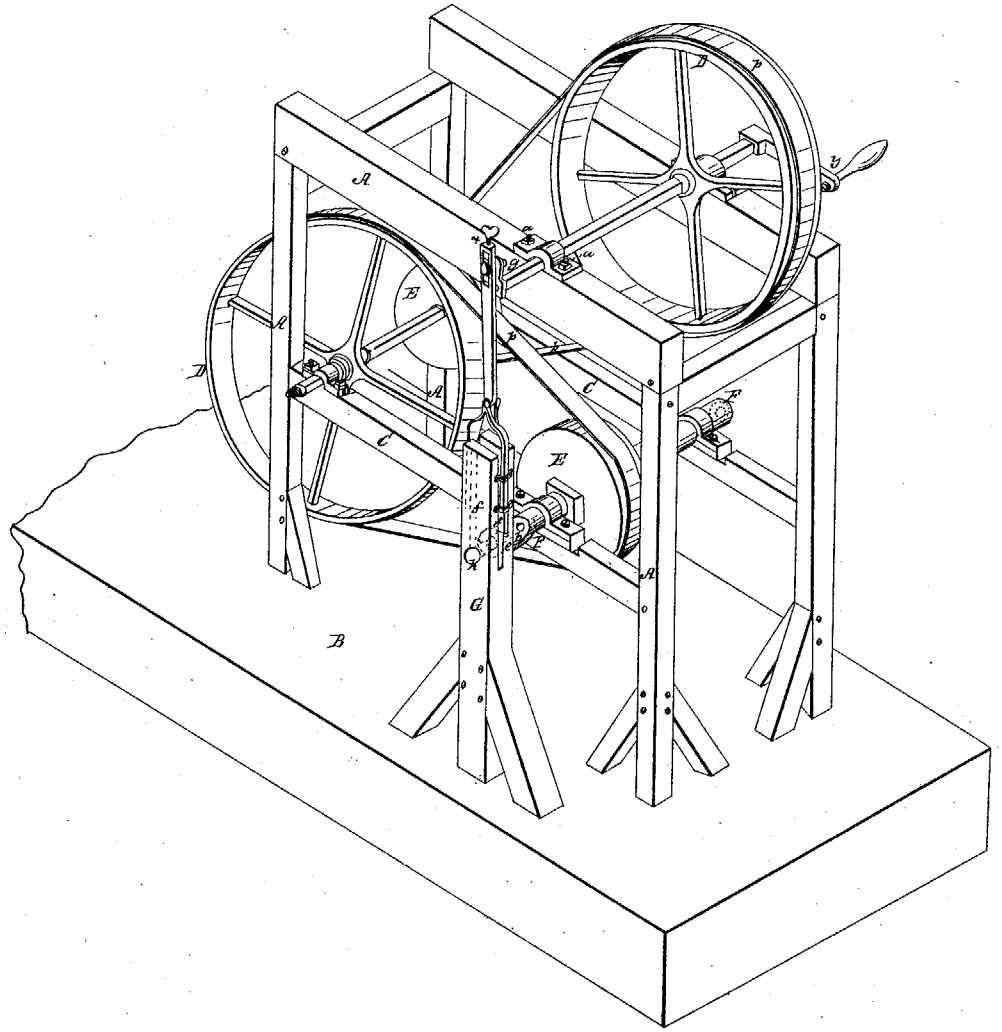
AM. PHOTO-LITHO. CO. N.Y. (OSBORNE'S PROCESS)

1741X 117

Robert W. Richards
Letters Patent

The Schedule referred to in these Letters Patent and making part of the same containing a description in the words of the said Robert W. Richards himself of his improvement in making Boots & Shoes by using wooden pegs made with screws or notches or creases

---

The sole work being made with wooden screws, which screws being driven in the heels and soles after an awl. The said screws being made in a machine which is made part of this invention this machine consists in a number of important principles. I have a frame with four posts at the corners being framed at the bottom to a plank. This machine is one foot and six inches long and high and eight inches wide the sides consist of two sticks of timber being framed to the posts. The running work consists of two wheels one foot diameter and two wheels being geared so as to add to the velocity sixteen to one of the wheels all run on iron shafts one shaft has two cranks one to put the machine in motion and the other crank to work the cutter, the shaft to run on [illegible] heads so [illegible] by screws as to tighten or loosen the bands or belts. I have a spindle where I work my screws. The spindle is eight inches long and hollow so as to have the stick run in the centre; on the end of the spindle I have two prongs where I fix on my box to cut the screws; the box is made similar to any box to cut a wooden screw. I have a part of the box where I cut the screws of brass or iron so as not to wear, with a thread — — — — — cut in the box to [illegible] the screws, my cutter to cut off the screws has its motion from the first wheel by a small crank, from that motion I have a chisel or knife that goes against a solid post, the post stands perpendicular with a hole in it to receive the screw rods, then the chisel works at the bottom of the post and cuts them a suitable length for driving by means of a gauge to rise or lowered by a screw. I find this machine can be varied a number of ways. I can go with one large wheel single geared or small wheels double geared the box to turn and spindle but I prefer the spindle and box to turn and the machine to be gear'd and likewise there can be creased or square pegs can be creased or dove tailed but I claim in all cases of pegs or screwed round or square this machine can be [illegible] to [illegible] a number of screws at a time Witnesses { Jedediah Richards
{ [illegible] Richards Robert W. Richards Drawing made by [illegible]

[illegible]